United States Patent [19]

Beacom et al.

[11] Patent Number: 5,093,908
[45] Date of Patent: Mar. 3, 1992

[54] METHOD AND APPARATUS FOR EXECUTING INSTRUCTIONS IN A SINGLE SEQUENTIAL INSTRUCTION STREAM IN A MAIN PROCESSOR AND A COPROCESSOR

[75] Inventors: Thomas J. Beacom, Pine Island; Jeffrey D. Brown, Rochester; Mark R. Funk, Rochester; Scott A. Hilker, Rochester; Daniel G. Young, Rochester, all of Minn.

[73] Assignee: International Business Machines Corporation, Armonk, N.Y.

[21] Appl. No.: 339,285

[22] Filed: Apr. 17, 1989

[51] Int. Cl.[5] .............................................. G06F 9/38
[52] U.S. Cl. ................................ 395/375; 364/228.6; 364/242.1; 364/262.4; 364/263
[58] Field of Search ... 364/200 MS File, 900 MS File

[56] References Cited

U.S. PATENT DOCUMENTS

| | | | |
|---|---|---|---|
| 4,755,966 | 7/1988 | Lee et al. | 364/900 |
| 4,777,613 | 10/1988 | Shahan et al. | 364/200 |
| 4,811,208 | 3/1989 | Myers et al. | 364/200 |
| 4,823,260 | 4/1989 | Imel et al. | 364/200 |
| 4,845,659 | 7/1989 | Hrusecky | 364/900 |
| 4,891,753 | 1/1990 | Budde et al. | 364/200 |
| 4,943,915 | 7/1990 | Wilhelm et al. | 364/200 |
| 4,967,351 | 10/1990 | Zmyslowski et al. | 364/200 |
| 4,974,155 | 11/1990 | Dulong et al. | 364/200 |
| 4,975,868 | 12/1990 | Freerksen | 364/748 |
| 4,991,078 | 2/1991 | Wilhelm et al. | 364/200 |
| 5,001,662 | 3/1991 | Baum | 364/757 |

Primary Examiner—Thomas C. Lee
Assistant Examiner—William M. Treat
Attorney, Agent, or Firm—J. Michael Anglin

[57] ABSTRACT

A tightly-coupled main processor and coprocessor overlap the execution of sequential instructions when apparent sequential operation and precise exception interrupts can be assured. Logic detects all conditions under which these criteria might potentially be violated in the coprocessor before it has finished performing an instruction, and holds off the main processor from executing a subsequent instruction.

16 Claims, 4 Drawing Sheets

METHOD AND APPARATUS FOR EXECUTING INSTRUCTIONS IN A SINGLE SEQUENTIAL INSTRUCTION STREAM IN A MAIN PROCESSOR AND A COPROCESSOR

BACKGROUND OF THE INVENTION

The present invention relates to electronic data processing, and more particularly concerns a data processing system having a tightly coupled main processor and coprocessor for executing different types of instructions in a single stream, in an overlapped manner.

It is sometimes convenient to provide a system having a fixed repertoire of instructions, and to enhance that repertoire by providing a coprocessor for performing the operations required by a second set of instructions. The most common example of this is the combination of a microprocessor with a coprocessor for performing floating-point operations. Other examples include coprocessors for performing graphics operations and text operations.

Usually the coprocessor is "tightly coupled" to the main processor. The main processor actually fetches all instructions and operands for both the main processor and the coprocessor. The coprocessor merely performs the operations required by the enhanced instructions, such as the addition, subtraction, multiplication, or division of floating-point operands fetched by the main processor. It is also common for the coprocessor to provide a "hold-off" signal back to the main processor; the main processor does not fetch—or at least does not begin to execute—a subsequent instruction of either type. Then, when the coprocessor has completely finished executing the current instruction, it releases the hold-off, signaling the main processor to begin the next instruction from the stream.

Such tightly-coupled processor/coprocessor pairs appear externally to be a single processor executing an enhanced instruction set. No performance increase occurs from this combination—usually, in fact, a penalty is incurred, because the instructions performed by the coprocessor tend to be lengthy and complex. No advantage is taken of the idle operational facilities of the main processor while the coprocessor is performing one of its operations.

SUMMARY OF THE INVENTION

The present invention pertains to a tightly-coupled pair of processors, and allows the operational facilities of the main processor to be utilized for executing another instruction in a common stream in some cases before the coprocessor has completed executing a previous instruction. That is, two instructions can be overlapped in time or executed concurrently, thus decreasing the apparent time required to execute the instruction stream as a whole.

Merely overlapping multiple instructions in different processors is not difficult. It is important, however, that the instructions in the stream still appear to execute strictly in sequence; that is the existence of the multiple processors must be transparent. This can be achieved if two criteria are fulfilled:

(1) Sequential operation—A subsequent instruction must not use the result of a previous instruction before this result is available.

(2) Precise exception interrupts—Exceptions or errors produced by any instruction must be attributable to that instruction alone by any handler routine which deals with interrupts produced by these conditions.

There are conventional ways of dealing with the first criterion, and the present invention does ensure that it is fulfilled. The major focus of the present invention, however, is upon the second criterion.

Now it is not often possible to know before the end of an instruction that its execution will definitely produce an exception. Frequently, however, there are conditions under which an exception might possibly occur, and these conditions can sometimes be known before the end of the instruction's execution. Furthermore, it turns out that in many cases these conditions are not as rife as one might think. That is, the number of actual instruction executions in which no exception can possibly occur are often far more numerous than those in which one or more exceptions can occur. Still further, a great many of the cases in which no exception can even potentially appear can be determined in sufficient time before the end of an instruction's execution that significant overlap can occur without fear of violating either of the above conditions.

The invention, then, allows a main processor and a tightly coupled coprocessor to overlap the execution of different instructions while maintaining sequential operation in the instruction stream and precise exception interrupts.

Broadly, the invention has a main processor and a coprocessor for different instructions. Logic in the coprocessor detects—before the completion of an instruction it is currently performing—that certain conditions may exist under which one of the above criteria might possibly be violated. The existence of these criteria inhibits the main processor from performing another instruction from the common stream, until the current instruction has passed the point where the criteria could be violated, usually at the end of the instruction's execution. (Stated oppositely, an inhibiting or hold-off signal is kept active until conditions in the coprocessor are such that the criteria cannot possibly be violated by further execution of the current instruction.)

Other objects and advantages of the invention, as well as modifications obvious to those skilled in the art, will appear from the following description of a preferred embodiment.

DESCRIPTION OF A PREFERRED EMBODIMENT

Figure 1:
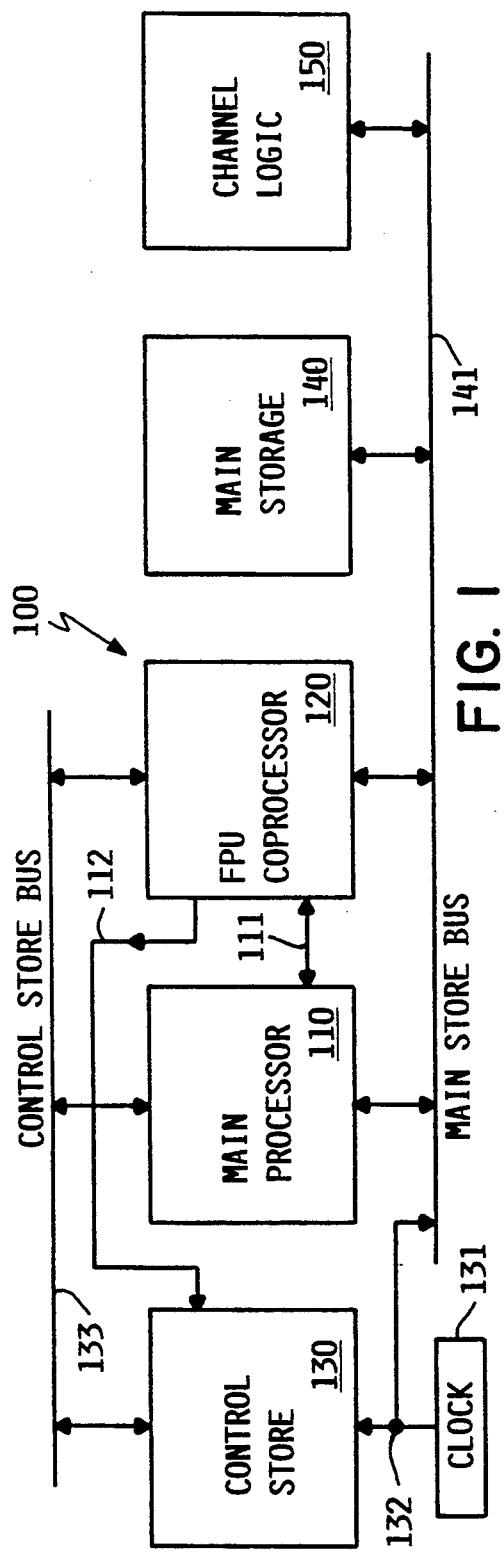
FIG. 1 is a block diagram of a data-processing system according to the invention.

FIG. 1 shows a data-processing system 100 having different processors for executing different types of instructions. Main processor 110 executes 'normal' (that is, non-floating-point) instructions, while coprocessor 120 executes only a special type of instructions, those whose operation codes designate them as floating-point instructions. The following list of some representative instructions of both the normal and special types of instructions gives a flavor of the kinds of instructions in each type.

| Normal Type Instructions | |
|---|---|
| OpCode | Action |
| MVC | Move characters |
| BC | Branch on condition |
| ADD | Add fixed-point operands |

| Floating-Point Type Instructions | |
|---|---|
| OpCode | Action |
| ALF | Add long-format FP operands |
| SSF | Subtract short-format FP operands |
| MLF | Multiply long-format FP operands |

The floating-point operations and operand number formats conform to the specifications of the American National Standard "IEEE Standard for Binary Floating-Point Arithmetic," ANSI/IEEE Std. 754-1985.

A conventional control store 130 holds horizontal microcode (HMC) control words having bit fields for influencing the data paths and operations of the processors, and for specifying the address of the next control word to be executed, possibly in connection with conditions existing in certain elements of the processors. Clock 131 sequences the control store in a conventional manner by signals on lines 132. Control-store bus 133 feeds the applicable bit fields of the current control word to both processors, and returns conditions to the control store for next-address selection. Some fields have meaning for only one of the processors, some apply to both processors, and some have different meanings for each processor in response to the state of particular bits in the word.

A conventional processor bus 111 transfers data between the two processors. Hold-off line 112 is used in the overlap process of the invention to inhibit control-word execution in main processor 110. Main storage 140 is a conventional read/write memory for holding both instructions and data. Main-store bus 141 has address, data, and control lines for transferring instructions and data to and from the processors 110 and 120. Channel logic 150 interfaces the processors and storage to input/output devices (not shown) in any known manner, via bus 141.

Processors 110 and 120 are "tightly coupled." That is, they act as a single processor as far as the rest of system 100 is concerned. They have internal data paths such as 111 not shared with the rest of the system. They are controlled by the same microcode controller 130, part or even all of which can be physically a part of one of the processors, usually the main processor. Coprocessor 120 could not be used by itself in a system; it has no facilities for fetching instructions, or even operands, from an external source. It is a parasite upon the the main processor 110, merely providing it with an optional extension to its instruction set by executing additional or specialized operations.

Figure 2:
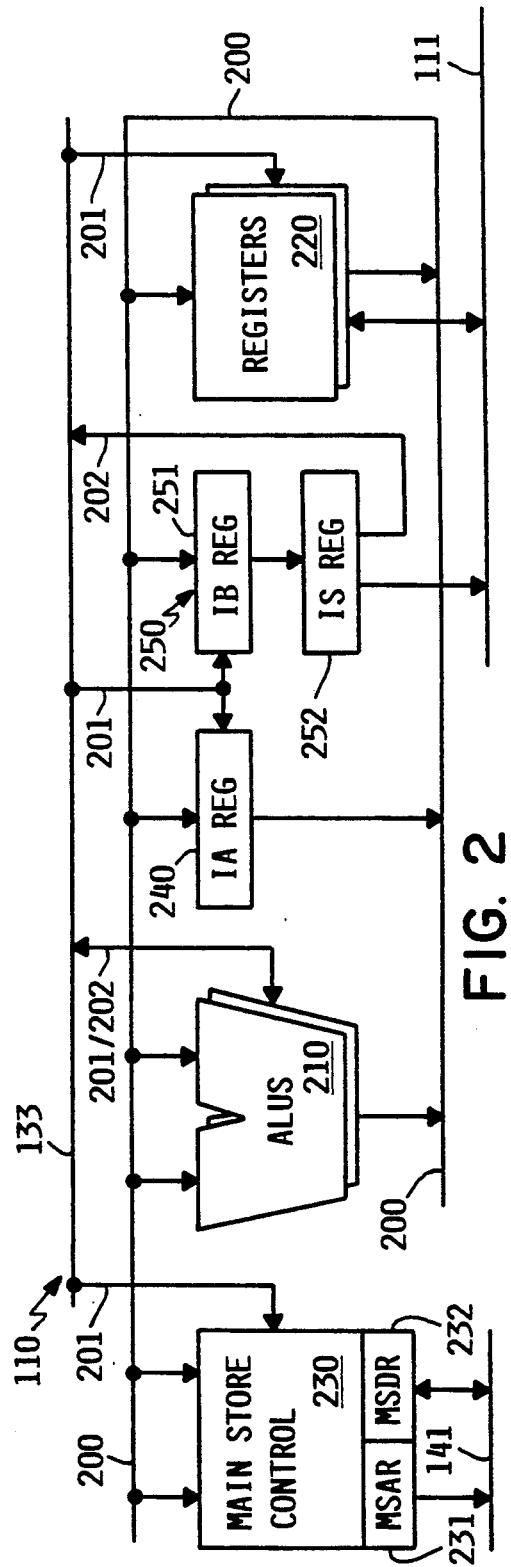
FIG. 2 is a block diagram of a part of the main processor of the system of FIG. 1.

FIG. 2 illustrates in a simplified form those parts of a representative main processor 110 which are helpful in understanding the invention. This may be, for example, the main processor of the publicly available IBM AS/400 Data Processing System. Such a processor includes conventional internal data paths 200 for interconnecting the other units in various configurations, arithmetic/logic units 210, registers 220, and unit 230 for controlling accesses to main store 140. This unit has a main-store address register 231 for holding addresses to be sent to the main store via bus 141, and main-store data registers 232 for holding data to and from the main store.

Instruction address register 240 holds the main-store address of the currently executing instruction, whether that instruction is executing in main processor 110 or in coprocessor 120. Instruction registers 250 holding the actual instruction words to be executed. IB register is a buffer register for queueing up a subsequent instruction; IS register 252 holds the currently executing instruction. The operation code (opcode) of the instruction in register 252 can be made available directly to coprocessor 120 over interprocessor bus 111. This bus also allows the contents of registers 220 to be transferred to and from the coprocessor.

Control words from storage 130 on bus 133 establish sequences of data flow among these units and the types of operations in the various functional elements; control lines 201 operate gates and logic (not shown) in the units themselves. The units may produce condition signals on lines 202 which influence which control word will be fetched next.

As is standard practice, microcode control words initiate the fetching of an instruction word and any operands required from main storage. The operation code of the current instruction is gated on one set of the lines 202 to control store 130, so as to select the address of a control word which initiates the interpretation or execution of that particular instruction. (The terms "interpretation" and "execution" have technically somewhat different connotations in this area; for the present purposes, however, they may be used interchangeably.)

If the instruction is of the normal type, that initial control word performs its functions in the main processor, then calls another word in a sequence of control words for carrying the instruction to completion. At the end of the instruction, IA register 240 holds the main-store address of the next instruction—or, if an error or interrupt has occurred, the address of an instruction to handle that particular situation.

If the instruction is of the floating-point (FP) type, the bits of the initial control word on bus 133 cause main processor 110 to decode the instruction; subsequent control words might initiate the fetching of any operands in the same manner as for a normal instruction. But the portions or fields of the control word which specifies the operation to be performed by the instruction causes coprocessor 120 to execute that particular function within this coprocessor: a floating-point add, subtract, multiply, divide, etc. This word also goes to main processor 110, but the bit pattern associated with the floating-point operation does not specify any operations to be performed there; it is a "no-operation" (no-op) as far as processor 110 is concerned. Although an FP operation could involve a sequence of control words in the same manner as a normal instruction, the coprocessor shown in FIG. 3 contains a sequencer 301 which performs multiple cycles within a single control word from controller 130. In this implementation, each of these cycles requires the same amount of time that clock 131 allots to a control word. Hold-off logic 302 sends a HOLD signal 303 to control store 130 to inhibit the next control word. This may be done in any conventional manner, such as by inhibiting clock signal 132 from advancing the control-store address to the next control word.

In the prior art, this type of signal is used to hold off the main processor until sequencer 301 had finished the entire execution of the FP operation. One or more subsequent control words might then be used to complete the interpretation of the FP instruction, by storing the result, for example.

Logic 302, however, can remove the hold-off before the end of the coprocessor's execution, whenever it can determine that the current instruction will go to completion without detecting any exceptions which would require main processor 110 to take some other action (such as an interrupt or exception) associated with that instruction. Removing the HOLD signal allows control store 130 to access and execute the next control word; this word can begin the interpretation of another instruction in the stream. In this manner, the overall instruction stream still appears to an outside observer to have executed in strict sequence, even though internally several instructions have executed concurrently with respect to each other. These two requirements are called 'precise exception interrupts' and 'sequential operation.'

The inputs to logic 302 derive from other elements of coprocessor 120. The structure and operation of coprocessor 120 is described more fully in commonly assigned applications filed on the same date herewith by D. L. Freerksen, "Floating Point Processor Having Pre-Adjusted Exponent Bias for Multiplication and Division" now U.S. Pat. No. 4,975,868, R. G. Allen et al., "Two-Bit Floating Point, Divide Circuit with Single Carry-Save Adder" U.S. Pat. No. 4,979,142, by T. J. Beacom et al., "Selection of Divisor Multipliers, in a Floating Point Divide Circuit" U.S. Pat. No. 4,996,660, J. D. Brown et al., "Method and Apparatus for Processing Postnormalization and Rounding in parallel" U.S. Pat. No. 4,926,370, and J. D. Brown et al., "Floating Point Normalization and Rounding Prediction Circuit" U.S. Pat. No. 4,941,120. For the present purposes, its functional parts can be greatly simplified.

A set of registers 310, communicating with data lines of main-storage bus 141 and with internal buses 304, holds a number of potential operands for FP instructions. Particular registers are selected by addresses from the main processor, on interprocessor bus 111.

Working registers 320 receive data from buses 304, and hold current operands and results. The exponent parts EA and EB from registers 321 and 322 connect to an arithmetic unit 330 for manipulating exponents as required for floating-point operations. The output of unit 330 is returned to register 321. A fraction arithmetic unit 340 receives the fraction or mantissa portions FA, FB, and FC of numbers stored in registers 321, 322, and 323. The output of this unit returns to buses 304, for storage in registers 320 or 310, or for transfer through bus 141. A conventional condition-code register 350 contains detectors for various conditions, such as overflow, denormalized results, and so forth. Its outputs can affect the operation of subsequent instructions by means of interprocessor bus 111 to main processor 110. Certain possible errors or exceptions can be masked under program control, by instructions in the instruction stream.

An exception mask register 360 contains a bit for each type of exception, indicating whether that exception is allowed or masked. This register receives inputs from both control-store bus 133 and interprocessor bus 111. This register allows a programmer to specify that certain kinds of errors are not significant for his purposes, and that their occurrence may be disregarded. For example, the previously mentioned floating-point standard specifies setting an "inexact result" exception when an arithmetic result would require additional bits for a precise representation. This is usually not of concern to an application program, and this exception is most often masked.

Hold-off logic 302 receives inputs from sequencer 301, bus lines 304, and exception mask register 360. Logic 302 can be any conventional form of logic for forming the logical OR of a number of conditions which signal the possible existence of exceptions in connection with the instruction currently executing in coprocessor 120.

The actual conditions which release a HOLD signal on line are listed below; that is the existence of all these conditions allows concurrency to occur. "Op1exp" and "Op2exp" are the exponents of the operands stored in registers 320; "Op2exp" is the divisor in a division operation. "Resexp" is the exponent of the result from unit 330. Numbers divided by a slash represent values for single-precision and double-precision instructions, respectively. The particular values are specific to the aforementioned IEEE standard; they have nothing to do with the mathematics of the arithmetic operations themselves, and they may vary with different implementations.

These conditions assure precise exception interrupts:
[Add OR Subtract] AND [Op1exp<=251/2043 AND Op2exp<=251/2043 AND (Op1exp=>32/64 OR Op2exp=>32/64)] AND [InexactException=Masked]

[Multiply] AND [Resexp<=252/2044 AND Resexp=>2 AND Op1Exp<>255/2047 AND Op2Exp<>255/2047] AND [InexactException=Masked]

[Divide] AND [Resexp<=250/2042 AND Resexp=>3 AND Op2exp<>0 Op1Exp<>255/2047 AND Op2Exp<>255/2047] AND [InexactException=Masked]

[SquareRoot] AND [Op1sign=Positive AND Op1Exp<>255/2047] AND [InexactException=Masked]

These conditions assure sequential operation:
[Instruction opcode control word specifies set condition-code register] AND [Floating-point sequencer is not done]

[Instruction opcode control word specifies store result in main storage] AND [Floating-point sequencer is not done]

[Instruction opcode specifies load/store FP register which is destination of result of current instruction]

[Instruction opcode specifies FP arithmetic operation] AND [Floating-point sequencer is not done] (i.e., the current FP instruction has not yet finished executing)

The satisfaction of less than all of these conditions produces a HOLD signal 303 because any of them indicates either that the instruction currently executing in coprocessor 120 might produce an exception, or that the subsequent instruction requires some resource (such as a result) not yet available from the current instruction. But the failure of a condition does not guarantee that an exception will occur, or that sequential operation will be violated. The conditions draw a boundary around the permissibility of concurrency, and this boundary is somewhat larger than those which are strictly necessary.

The difference between the conditions which release the HOLD signal and the conditions which are strictly necessary for concurrency arise from two causes. First, the logic 302 is simplified. For example, an exception occurs when an arithmetic operation is attempted upon an operand which is not a number. Under the aforementioned IEEE standard, an operand having an exponent of 255/2047 (for single/double precision) and a fraction value of all zeros is a "not-a-number" (NaN). But logic 302 only tests for the existence of the exponent (Op1exp and Op2exp must be less than or equal to 251/2043), because testing for the fraction value would require an additional 52-input AND gate.

The second reason for the difference between tested and actual conditions is that the tested conditions may allow the possibility of an exception to be predicted at a time earlier than that required for evaluation of the actual condition. For example, with few exceptions the existence of an inexact result cannot be known before the result itself has been produced in extenso. Since the inexact-result exception is masked most of the time, very little performance is lost by merely prohibiting concurrency whenever this exception is not masked. As another example, Op2exp<2 in a divide operation does not necessarily imply that the divisor is equal to zero or that an overflow will occur in the quotient; even a zero exponent in the divisor could represent merely a denormalized number, and not a true zero. But the overflow from this set of conditions would not be known until a later time. So allowing concurrency only for certain minimum exponent values permits concurrency to begin at an earlier time. Thus, many of the exceptions are not certain to occur under the tested conditions; indeed, in many cases they will not occur. But, because the impossibility of their existence can be determined quite early in the execution of the current instruction in coprocessor 120, the HOLD signal to be turned off or released as early as it is safe to permit the main processor 110 to proceed with the execution of the next instruction in its stream. This allows the floating-point coprocessor 120 to continue executing an instruction while the main processor 110 executes a subsequent instruction, while still assuring precise exception interrupts.

In this implementation, the HOLD signal is normally latched on (i.e., in a active state, prohibiting concurrency) by a signal 305 from sequencer 301 while the sequencer is executing its cycles, but can be turned off at the end of the first cycle by the existence of the above conditions. That is, the existence of the requisite conditions must be known by the end of the first cycle. Some of the above conditions require knowledge of the exponent of the result of the current operation. An exponent arithmetic unit 330 such as that described in the aforementioned application to Freerksen is capable of producing this result exponent in a single sequencer cycle. It would also be feasible, however, to detect the existence or nonexistence of certain conditions at different or even at a number of times during the operation of sequencer 301, so that HOLD line 303 could be released (or never made active at all) whenever a certain concurrency-blocking condition is known to be definitely precluded. For example, if unit 330 required two sequencer cycles to produce an exponent result, HOLD could be active at the end of the first cycle of a multiply instruction if the exponent of either operand exceeded half the maximum result value; subsequently, HOLD could be lowered at the end of the second cycle if in fact the result exponent (i.e., the sum of the operand exponents) did not exceed the maximum value. Since a multiply operation can require up to seventeen sequencer cycles, this would still allow a significant overlap with the subsequent instruction.

Figure 4A:
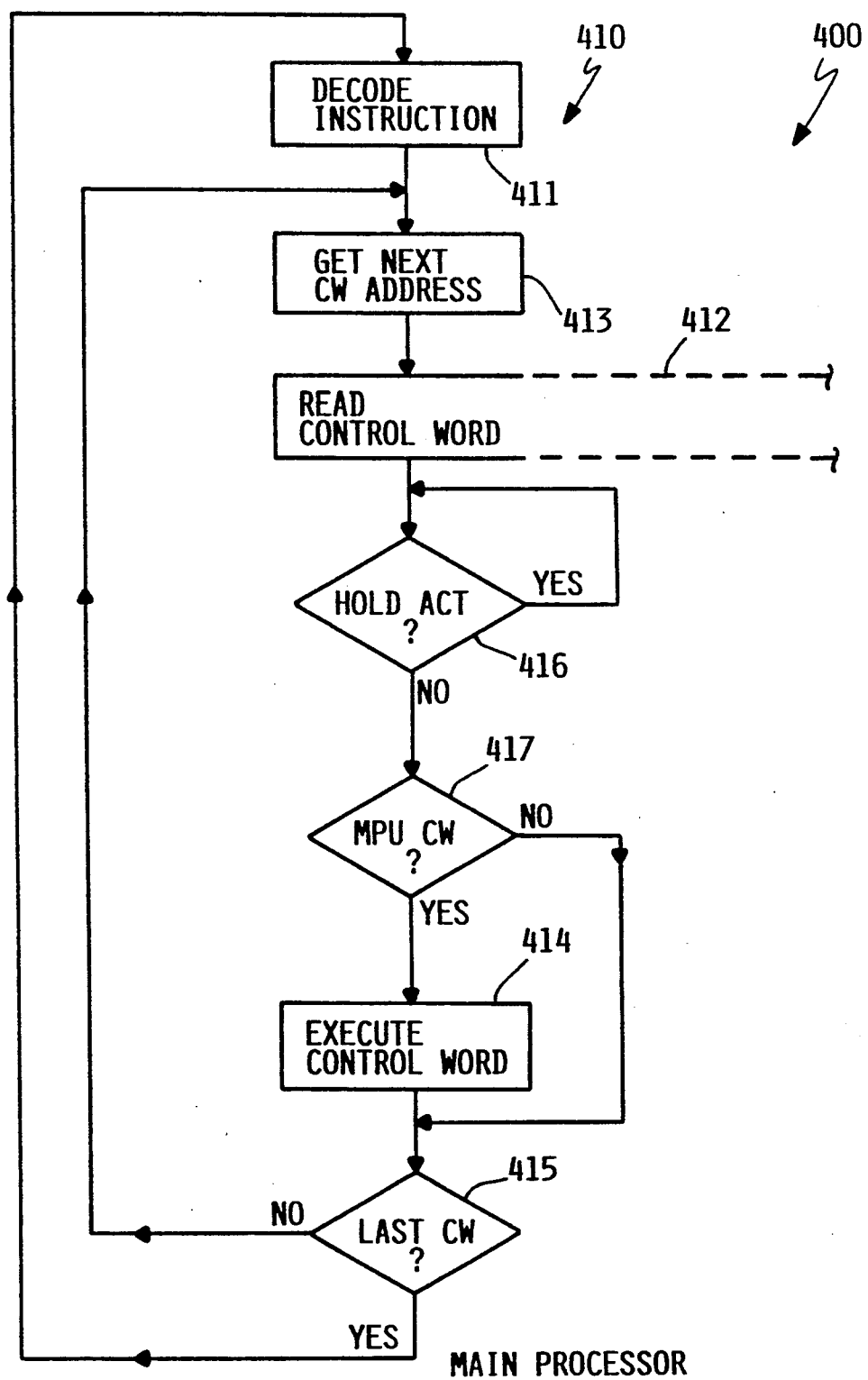
FIG. 4 is a flowchart of microcode for overlapping instruction execution between the processors of FIGS. 2 and 3.
Figure 4B:
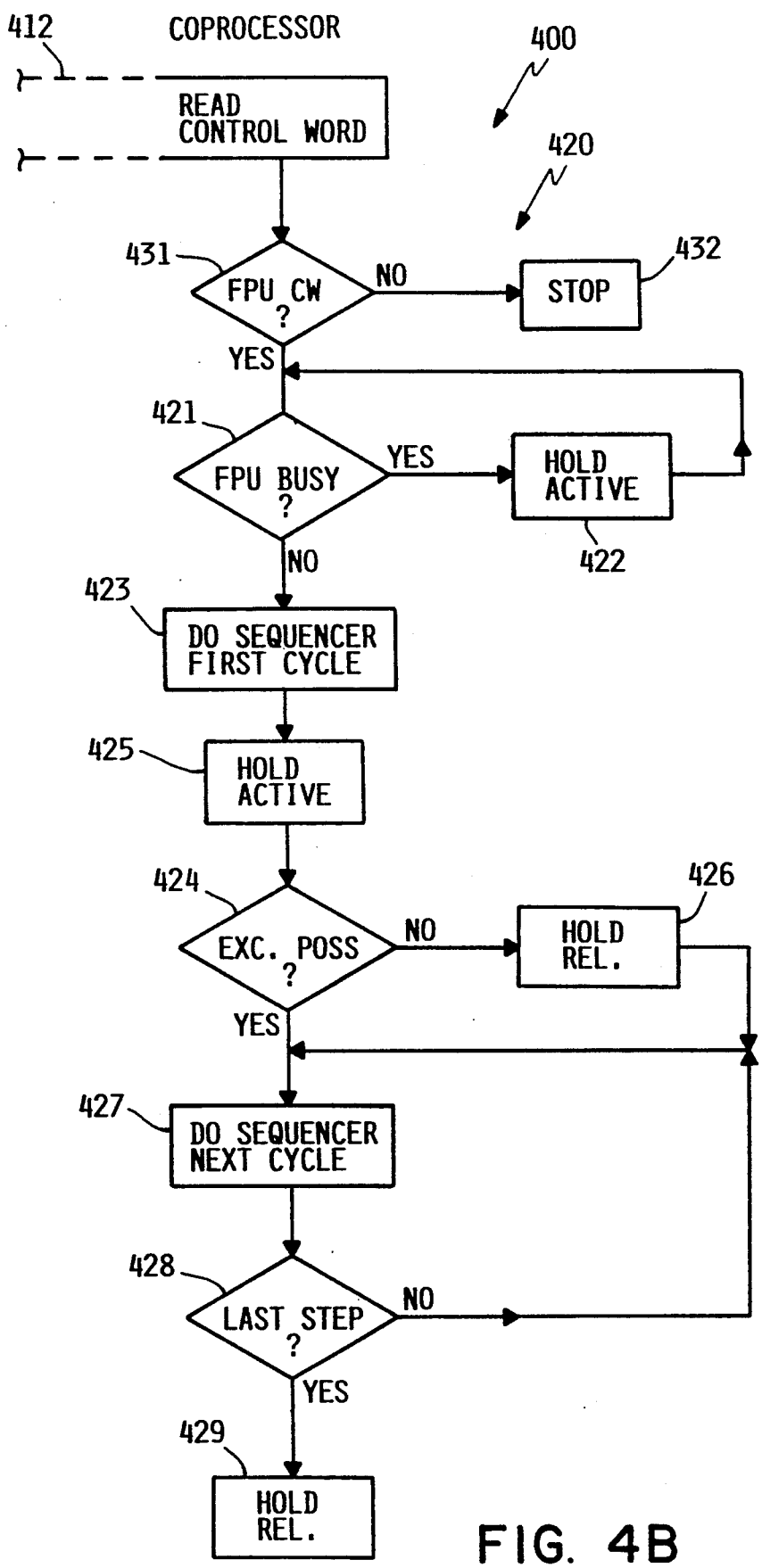

FIG. 4 is a flowchart representation 400 of the HMC microcode flow in both the main processor 110 and the coprocessor 120, insofar as it applies to the present invention. FIG. 4 is laid out so that events in the main processor occur at the left, and events in the coprocessor occur at the right side of the diagram. These two sequences of events are asynchronous with respect to each other, except as explicitly shown. It should be stressed that flowchart 400 is only a symbolic representation of events occurring in the two processors and in the control store. There is no overall mechanism which "executes" this flowchart; it does not represent a "program" as such, but rather the inherent operation of the system 100.

Each microcode loop 410 interprets one instruction in the instruction stream sent to main processor 110. The first microcode word for every instruction is a control word interpreted at block 411 for decoding the instruction's opcode; it selects a sequence of control words for executing the entire instruction. Block 413 determines the address of the first word in this sequence from an address in the word executed at block 411. Block 412 reads this control word. As described previously, this word is read simultaneously by elements of the main processor 110 and by elements of the coprocessor 120, by means of bus 133, FIG. 1. If the HOLD signal on line 112 is active, block 416 arrests further interpretation in the main processor until the HOLD is released.

If this word does not specify any action within the main processor, block 417 drops through to block 415. But, if the main processor responds to any field of this control word, block 414 executes or interprets any action called for. Coprocessor 120 also "sees" this control word, but sequencer 301 decodes it as a no-operation; thus, only main processor 110 performs any functions in response to this word. Step 414 continues until a clock signal occurs. Then, if the current control word is not the last in the sequence, block 415 returns control to block 413. Block 412 then gets the address of the next control word of the sequence, as specified by previous word in the sequence.

This loop 410 through blocks 411–417 continues until block 415 detects that the current control word is the last in its sequence, as signified by a bit in the word. In this case, block 415 returns control to block 411, which causes control 130 to obtain a control word for initiating the interpretation of the next instruction in the stream from main store 140. This is done in a conventional manner by trapping to the first control word of the control-word sequence or microroutine for that instruction opcode.

As noted previously, main processor 110 performs operand fetches and result stores for FP-type instructions as well as for 'normal'-type instructions. Therefore, some control words of FP instructions are actually executed in loop 410. The coprocessor executes those control words which specify the arithmetic operations for FP-type instructions. When block 412 reads such a control word, the coprocessor responds by executing routine 420. That is, sequencer 301 causes coprocessor 120 to respond to the word, but the word does not specify any operation within main processor 110. Block 431 symbolizes this action. If the control word causes an action within the coprocessor, block 421 is executed; otherwise, the procedure 420 stops at block 432.

Figure 3:
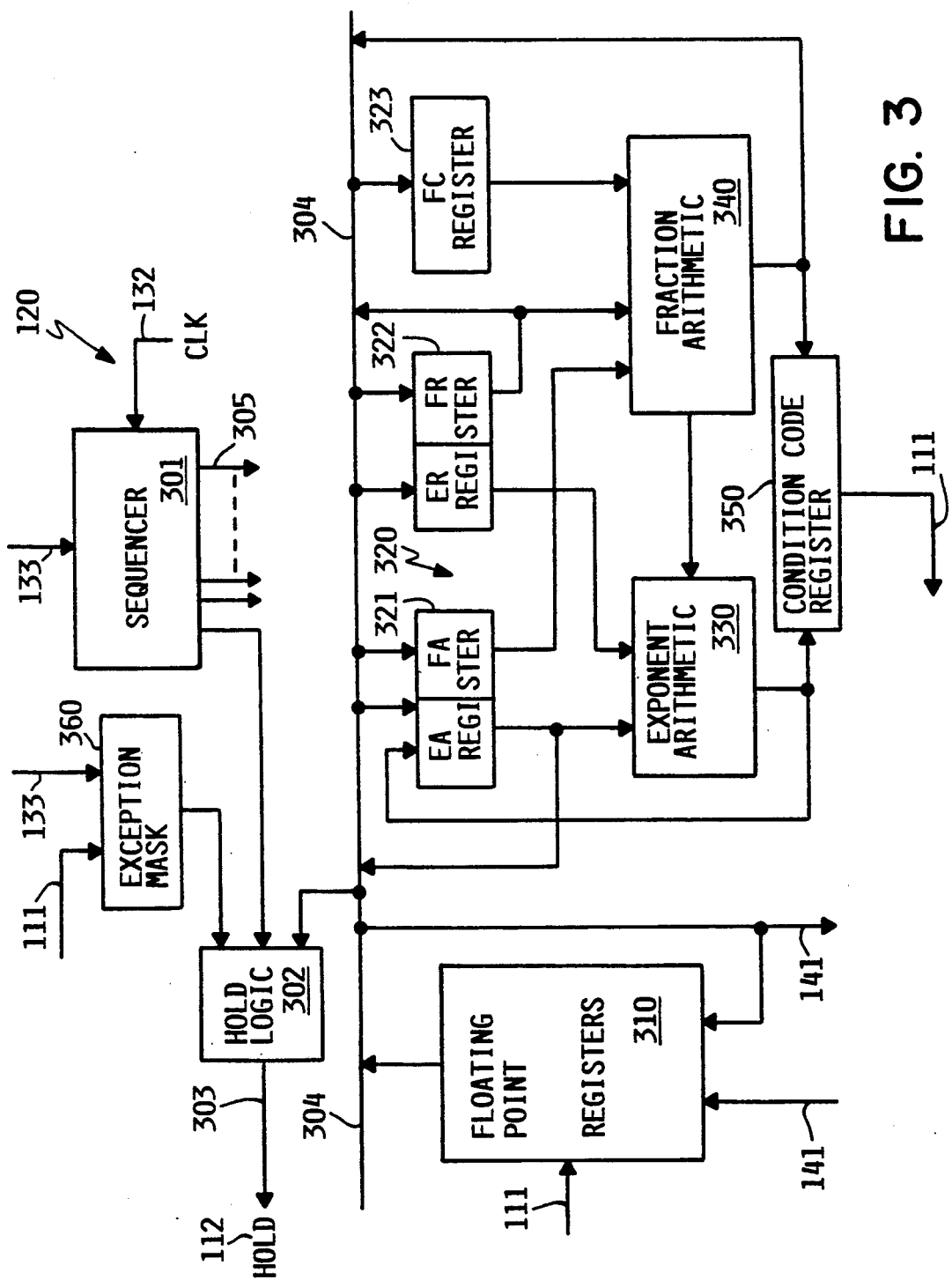
FIG. 3 is a block diagram of a part of the coprocessor of the system of FIG. 1.

It is possible at this time that the coprocessor is still busy executing a previous instruction, or that the FP registers 310, FIG. 3, are in use; this condition is indicated by the state of certain bits within sequencer 301 which specify the current gating of coprocessor resources. If so, block 421 causes block 422 to raise the HOLD signal 303 to an active state. Block 421 loops on itself until sequencer 301 releases the HOLD. The coprocessor can then proceed with executing the FP operation. (Note that both of the processors are blocked from proceeding under this condition.)

When block 421 indicates that the coprocessor is ready, block 423 starts the coprocessor sequencer 301 by resetting it to its first cycle, and by transmitting the signals 305 for that cycle to all the elements of coprocessor 120. During this sequencer cycle, block 425 latches the HOLD signal active. At the end of the cycle, logic 302 may determine that there is no possibility of an exception during this operation. If so, block 426 releases the HOLD. In either event, block 428 increments the sequencer to the next cycle and executes it. When the cycle is completed, at the end of a clock period, block 428 loops through block 427 until the last sequencer cycle has been completed. At that point, block 429 releases the HOLD signal and ends the processing of the control word.

If the HOLD signal had been active, it is always released at the end of the last sequencer cycle. Thus, the main processor can continue executing loop 410, if it had been waiting at block 416. (Otherwise, of course, it continues to execute in parallel with routine 420.)

As mentioned, the present implementation uses only a single control word for carrying out the entire arithmetic operation of an FP-type instruction. Alternatively, it is possible to modify procedure 400 so that a sequence having multiple control words executes the FP operation in coprocessor 120. It is also possible to activate and release the HOLD at times other than the end of the first sequencer cycle, perhaps at more than one time during a single sequence of cycles.

The table below shows a simplified series of sequencer cycles for executing a floating-point multiply instruction in coprocessor 120. The operations of the first section are performed only during the first cycle, Cycle 1. The operations shown in the second section occur during every cycle, Cycle 1 through Cycle N. The operations of the third section take place only during the last cycle, Cycle N. At the beginning, FC register 323 holds the multiplier fraction, FB register 322 holds the multiplier fraction and exponent, and FA register 321 holds the multiplicand fraction and exponent. During the operation, register 321 holds the exponent of the result, and register 322 holds the partial-product fraction. At the end of the multiply operation, they hold the complete product. Coprocessor 120 uses an iterative recoding algorithm which retires four bits of the multiplier per sequencer cycle. Postnormalization and rounding of the result are performed during cycle N.

Cycle 1

EA→Exponent Arithmetic Unit
EB→Exponent Arithmetic Unit
Exponent Arithmetic Unit→EA
Exception Mask Register→Hold-Off Logic
Activate Hold-Off Logic Cycles 1 through N FA→Fraction Arithmetic Unit
FB→Fraction Arithmetic Unit
FC→Fraction Arithmetic Unit
Fraction Arithmetic Unit→FA
FC right 4 bits→FC Cycle N EA→Exponent Arithmetic Unit
Fraction Arithmetic Unit→Exponent Arithmetic Unit
Exponent Arithmetic Unit→EA
Release HOLD signal The aforementioned application by Freerksen contains a more detailed exposition of this sequence.

Having described a preferred embodiment thereof, we claim as our invention:

1. A method of executing instructions in a single sequential instruction stream in a main processor and a coprocessor, said instructions being of two different types, a first type at least a portion of which is executed in said coprocessor to produce a result, and a second type which is executed in said main processor, said coprocessor including means for producing an exception signal upon the occurence of predetermined values of said result said method comprising the steps of:

obtaining from said instruction stream a first of said instructions specifying at least two operands and an operation to be performed upon said operands to produce said result;

determining that a first instruction of said instructions is of said first type, and performing the subsequent steps in response thereto;

commencing the execution of said first instruction in said coprocessor;

during the execution of said first instruction and before said result is produced, testing for the presence of a number of conditions within said coprocessor, which conditions indicate that said result, when subsequently produced, might possibly, but will not necessarily, generate said exception signal, and producing a hold-off signal in response thereto;

obtaining from said instruction stream a second of said instructions;

determining that said second instruction is of said second type, and performing the subsequent steps in response thereto;

in response to a first state of said hold-off signal indicating that none of said conditions is present in said coprocessor, commencing the execution of said second instruction in said main processor at a certain time before the completion of the execution of said first instruction in said coprocessor and before said result has been fully produced;

in response to a second state of said hold-off signal indicating that at least one of said conditions is present in said coprocessor, holding off the execution of said second instruction in said main processor until a time subsequent to said certain time.

2. The method of claim 1, wherein said coprocessor executes said first instruction in a sequence having multiple cycles.

3. The method of claim 2, wherein the step of determining that said second instruction is of said second type occurs during one of said multiple cycles preceding a last of said multiple cycles.

4. The method of claim 1, wherein said main processor obtains said operand for said first instruction.

5. The method of claim 1, wherein some of said potential exception conditions are responsive to a condition of said operand.

6. The method of claim 5, wherein said some conditions indicate that said operand has an improper magnitude.

7. The method of claim 5, wherein said some conditions indicate that said operand is incompatible with an operation specified by said first operation code.

8. The method of claim 1, wherein said first instruction has specifications for first and second operands, and wherein the execution of said first instruction produces a result by combining said operands, and wherein a portion of said result is produced before the completion of execution of said first instruction.

9. The method of claim 8, wherein at least some of said conditions are responsive to said result portion.

10. A data-processing system, comprising:
a main processor for executing a first set of instructions;
a coprocessor for executing at least a portion of all instructions in a second set different from said first set of instructions, each of a number of the instructions in said second set specifying a type of operation and an operand having a value;
fetch means in said main processor for obtaining instructions of both said sets intermixed in a single stream;
initiating means coupled to said fetch means for starting instructions in said main processor and in said coprocessor respectively, a subsequent instruction of said second set being started before the completion of a previous instruction of said first set in said instruction stream;
first execution means in said main processor responsive to said initiating means for performing instructions of said first set;
second execution means in said coprocessor responsive to said initiating means for performing instructions of said second set so as to produce respective results, and for producing exception signals upon the occurence of predetermined values of said respective results;
detecting means coupled to said fetch means for sensing multiple conditions in a current one of said instructions being performed in said second execution means prior to the occurrence of said respective results, said conditions representing the possibility but not the necessity that said respective results will subsequently have said predetermined values; and
means for producing a hold signal as a logical function of said multiple conditions at a time before said second execution means has produced one of said respective results corresponding to said current instruction, said detecting means being coupled to said initiating means for delaying the execution of said subsequent instruction in said instruction stream.

11. The system of claim 10, wherein at least some of said conditions are responsive to certain values of said operand.

12. The system of claim 11, wherein at least some of said conditions are responsive to a combination of said certain values and an operation specified by said current instruction being executed in said coprocessor.

13. The system of claim 10, wherein said coprocessor includes an exception register for specifying whether certain conditions are masked, and wherein said detector means is responsive to said exception register for inhibiting certain of said conditions when said certain exceptions are masked.

14. The system of claim 10, wherein said second execution means produces at least a portion of a result prior to completing the entire execution of said current instruction.

15. The system of claim 14, wherein at least some of said conditions are responsive to said result portion.

16. The system of claim 15, wherein said result portion is an exponent.

* * * * *